United States Patent [19]
Kobayashi et al.

[11] Patent Number: 5,572,509
[45] Date of Patent: *Nov. 5, 1996

[54] METHOD FOR MOUNTING MAGNETIC PLATE TO DISC SUBSTRATE

[75] Inventors: Daiki Kobayashi; Hiromichi Takano, both of Miyagi, Japan

[73] Assignee: Sony Corporation, Tokyo, Japan

[*] Notice: The term of this patent shall not extend beyond the expiration date of Pat. No. 5,323,381.

[21] Appl. No.: 390,436

[22] Filed: Feb. 16, 1995

Related U.S. Application Data

[63] Continuation of Ser. No. 65,934, May 24, 1993, abandoned.

[30] Foreign Application Priority Data

May 26, 1992 [JP] Japan ................................ 4-157306
Jul. 9, 1992 [JP] Japan ................................ 4-204323

[51] Int. Cl.$^6$ .............................. G11B 3/70; G11B 5/84; G11B 7/26
[52] U.S. Cl. ............................. 369/290; 369/282
[58] Field of Search ........................ 369/290, 291, 369/289, 282, 270, 271; 156/73.1, 580.1, 580.2

[56] References Cited

U.S. PATENT DOCUMENTS

| | | | |
|---|---|---|---|
| 3,581,969 | 6/1971 | Bodine | 228/1 |
| 4,687,536 | 8/1987 | Hiramatsu et al. | 156/556 |
| 4,787,009 | 11/1988 | Takahashi | 369/282 |
| 4,797,764 | 1/1989 | Doering | 360/135 |
| 4,829,510 | 5/1989 | Takahashi | 369/290 |
| 4,834,819 | 5/1989 | Todo et al. | 156/73.1 |
| 4,903,224 | 2/1990 | Namiki et al. | 369/290 |
| 4,926,410 | 5/1990 | Suzuki et al. | 369/290 |
| 4,944,982 | 7/1990 | Kikuchi | 428/64 |
| 4,981,538 | 1/1991 | Kikuchi | 156/73.1 |
| 5,110,403 | 5/1992 | Ehlert | 156/73.1 |
| 5,115,961 | 5/1992 | Nakajima | 156/73.1 |
| 5,323,381 | 6/1994 | Takahashi et al. | 369/270 |

FOREIGN PATENT DOCUMENTS

| | | | |
|---|---|---|---|
| 3702189 A1 | 7/1987 | Germany . | |
| 60-11147 | 3/1985 | Japan | 156/73.1 |
| 5-28539 | 2/1993 | Japan | 369/290 |

OTHER PUBLICATIONS

May 13, 1994, Communication, The European Search Report, 3 pages in length.

*Primary Examiner*—John H. Wolff
*Assistant Examiner*—William R. Korzuch
*Attorney, Agent, or Firm*—Limbach & Limbach L.L.P.

[57] ABSTRACT

A method for mounting a magnetic plate on a disc substrate. The method includes the steps of placing the magnetic plate within a housing recess formed in the disc substrate, abutting a horn of an ultrasonic wave generating unit generating torsional vibrations on a rim of the housing recess of the disc substrate under application of a predetermined pressure, and ultrasonically forming a protrusion directed towards an inner space of said housing recess for mounting the magnetic plate on the disc substrate by protrusion.

13 Claims, 12 Drawing Sheets

METHOD FOR MOUNTING MAGNETIC PLATE TO DISC SUBSTRATE

This is a continuation of application Ser. No. 08/065,934, filed on May 24, 1993, now abandoned.

BACKGROUND OF THE INVENTION

1. Field of the Invention

This invention relates to a method for mounting a magnetic plate to a disc substrate. More particularly, it relates to a method for mounting a magnetic plate to the substrate of an optical disc or a magneto-optical disc.

2. Description of the Related Art

There has hitherto been proposed a disc for recording information signals, such as an optical disc or a magneto-optical disc. Since this type of disc allows for high-density recording of information signals, there has been proposed a disc of an extremely small size, such as an optical disc or a magneto-optical disc which is approximately 64 mm in diameter and which allows for recording of music signals continuing for about 74 minutes.

The magneto-optical disc, which is of a small diameter and yet permits high density recording of information signals, is loaded on a driving unit so as to be rotated at a constant linear velocity. As the disc is rotated, a light beam is radiated from an optical pickup device onto fine recording tracks formed on a signal recording layer on a major surface of the disc. Simultaneously, an external magnetic field, modulated in accordance with recording information signals, is applied to the disc from an external magnetic field generating unit, such as a magnetic head, for recording desired information signals on the disc.

For correctly radiating the light beam to the fine recording track during high-speed rotation of the disc, it is necessary for the magneto-optical disc to be loaded in position on the driving unit such that the center of rotation of the disc is coincident with the center of rotation of the disc table. To this end, a disc loading system has been proposed in which a magnetic metal plate is provided on the side of the magneto-optical disc so as to be attracted by a magnet provided on the disc table for chucking the magneto-optical disc with respect to the disc table. This system is proposed, for example, in U.S. Pat. Nos. 4,926,410, 4,829,510, and 4,787,009.

Figure 1:
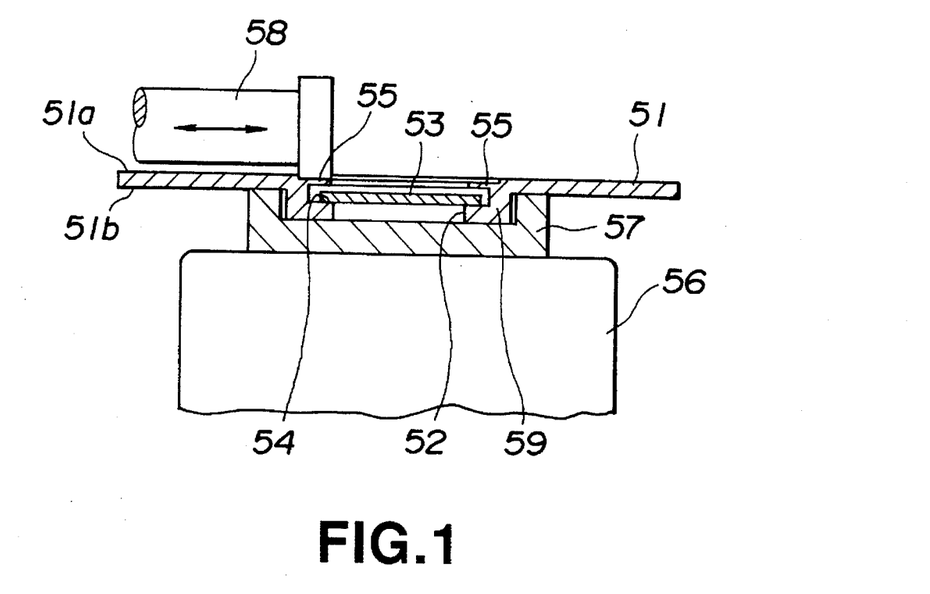
FIG. 1 is a cross-sectional view showing the mounting of the magnetic plate on the disc substrate by applying horizontally directed vibrations thereto.

The magneto-optical disc, employed in a magnetic chucking system, is provided with a disc substrate 51 molded of a synthetic resin, such as a transparent polycarbonate resin, in the form of a disk, as shown in FIG. 1. On one major surface 51a of the disc substrate 51, there is formed a recording layer on which information signals are to be recorded. The major surface 51b of the disc substrate 51, opposite to the major surface 51a having the recording layer, is designed as a write/read surface for information signals. A light beam is radiated to the signal recording layer from the write/read surface for recording and/or reproducing desired information signals.

The mid part of the disc substrate 51 has a centering aperture 52 engaged by a centering member provided on the driving unit. A magnetic metal plate 53 in the form of a disk is provided at the center of the major surface 51a of the disc substrate 51 for closing the centering aperture 52. The magnetic plate 53 is disposed so as to be accommodated within a housing recess 54. The housing recess encircles the centering aperture 52 on the major surface 51a of the disc substrate 51. A number of protrusions 55 directed to the inner side of the housing recess 54 are formed by ultrasonic machining of the rim of the recess 54. The magnetic plate 53, placed within the recess 54, is positionally maintained by these protrusions 55 with respect to the disc substrate 51.

The magnetic plate 53 is mounted on the disc substrate 51 in the following manner. The disc substrate 51 is first set in position on a disc support base 56, as shown in FIG. 1. The disc support base 56 has a disc rest 57 for accommodating a protuberance 59. The protuberance 59 delimits the outer periphery of the recess 54 of the disc substrate 51 while positioning the disc substrate 51. Specifically, the disc substrate 51 is positioned by having the protrusion 59 accommodated within the disc rest 57.

As shown in FIG. 1, a horn 58 is placed in abutment with the rim part of the recess 54 of the disc substrate 51 set on the disc rest 57. To this horn 58 are transmitted ultrasonic vibrations from an ultrasonic oscillator, not shown. The ultrasonic vibrations are propagated in a direction parallel to the major surface 51a of the disc substrate 51, that is, they are horizontally directed ultrasonic vibrations.

The result is that the portion of the synthetic material in the region of the recess 54 in contact with the horn 58 is melted due to the heat of friction so that the melted synthetic material is caused to flow inwardly of the rim to form the protrusions 55. This causes the magnetic plate 53 to be loosely accommodated and held in the recess 54. It is noted that the protrusions 55 are formed at, e.g., four positions around the recess 54 to prevent the magnetic plate 53 from being disengaged from the disc substrate 51.

However, since the propagation of ultrasonic vibrations along the thickness of the disc substrate 51 is limited, only two protrusions 55 at most may be formed by each ultrasonic forming operation, despite the fact that the thickness of the protrusions 55 designed to prevent the magnetic plate from becoming detached may be controlled with high accuracy. The result is lower productivity due to increased tack time and insufficient strength of the protrusions 55.

Figure 2:
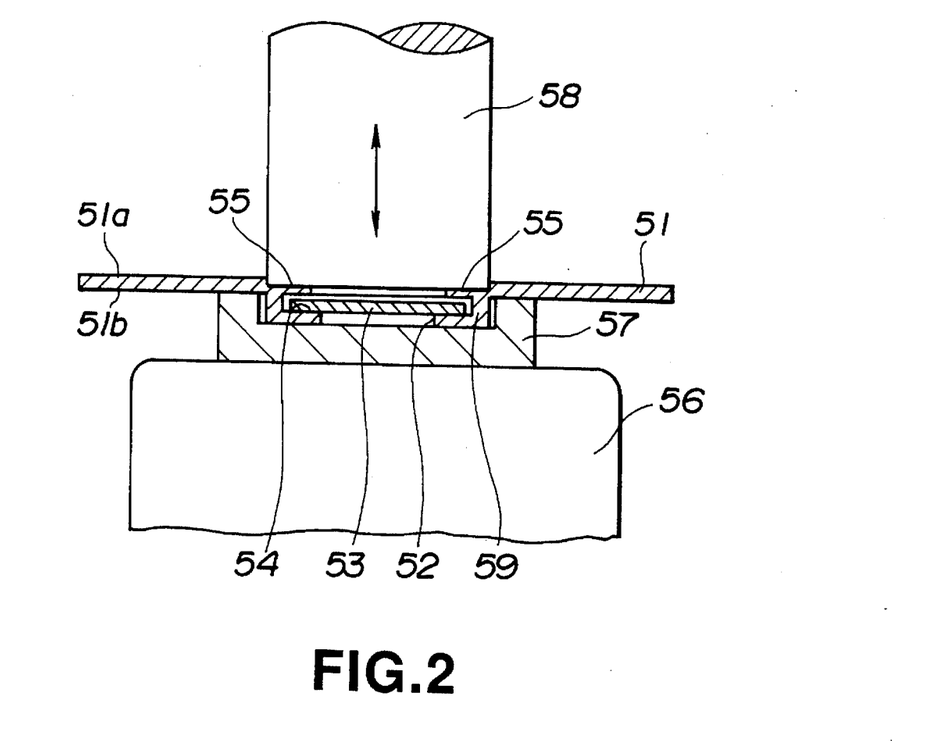
FIG. 2 is a cross-sectional view showing the mounting of the magnetic plate on the disc substrate by applying vertically directed vibrations thereto.

With this consideration, attempts have been made to apply a columnar horn 58 perpendicular to the major surface 51a of the disc substrate 51, and to apply vertically directed vibrations to the horn 58, as shown in FIG. 2.

With the method of applying vertically directed ultrasonic vibrations, an annular protrusion 55 may be formed on the entire rim of the recess 54. This is achieved by contacting the horn 58 with the disc substrate 51 and applying longitudinal ultrasonic vibrations thereto. This method is directed to improving productivity with respect to tack time.

Figure 3:
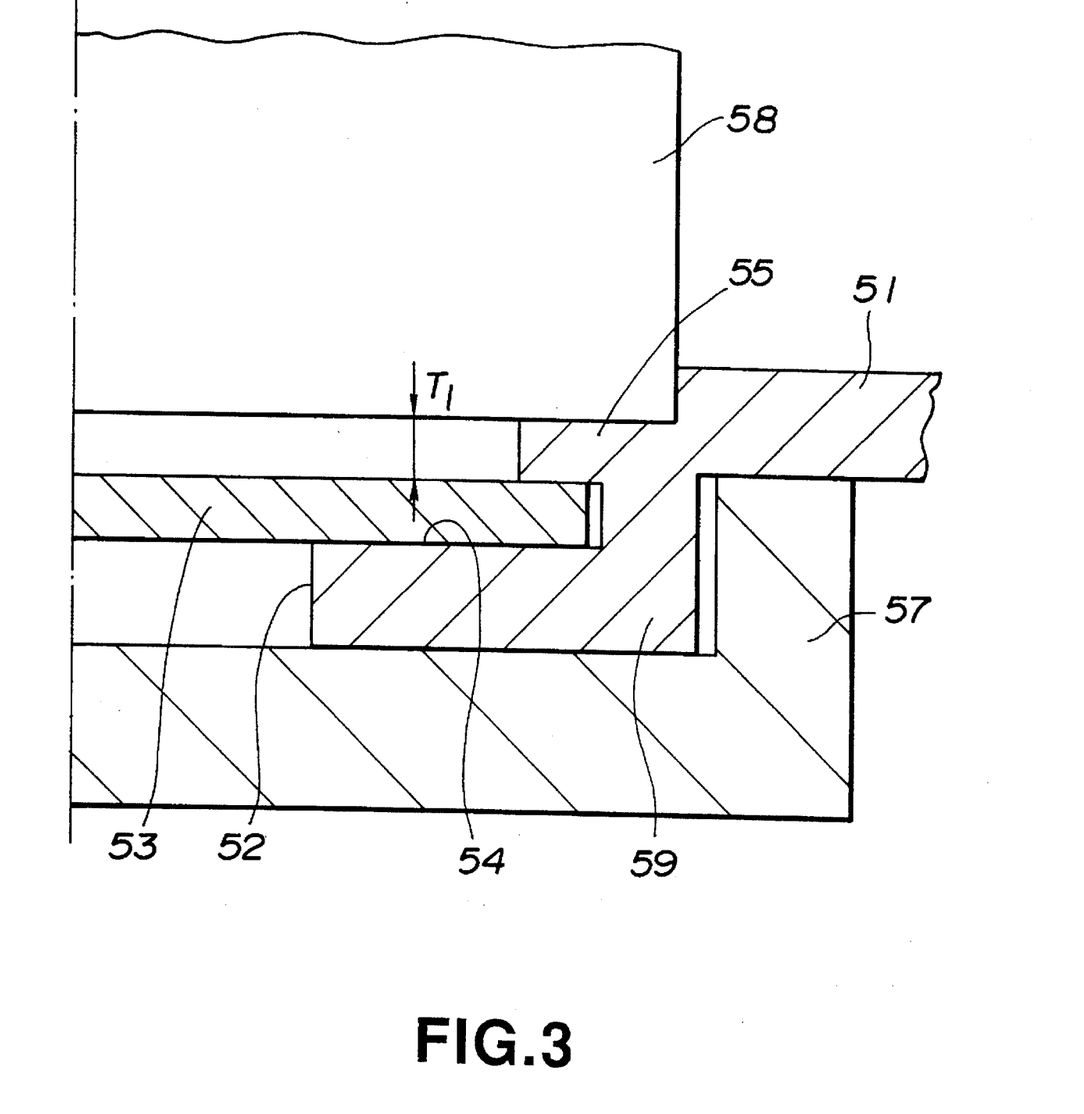
FIG. 3 is an enlarged cross-sectional view showing the particular parts of the magneto-optical disc to which vertically directed vibrations are being applied.

However, since the vibrations are applied perpendicularly to the disc substrate 51, it is extremely difficult to control the thickness $T_1$ of the protrusion 55, as shown in FIG. 3. The result is that the magnetic plate 53 tends to be stationary with respect to the disc substrate 51. In other words, it is difficult to provide a clearance between the magnetic plate 53 and the protrusion 55. If the magnetic plate 53 is stationary with respect to the disc substrate 51, then disc substrate 51 tends to be deformed due to the difference between the thermal expansion coefficients of the magnetic metal plate 53 and the disc substrate of synthetic material 51. The result is that birefringence is produced in the disc substrate 51, deteriorating its optical properties and causing data write/read problems.

SUMMARY OF THE INVENTION

It is an object of the present invention to provide a method of mounting a magnetic plate on a disc substrate which is devoid of the above-mentioned problems.

According to the present invention, a method is provided for mounting a magnetic plate on a disc substrate of a synthetic material. The method comprises: placing the magnetic plate within a housing recess of the disc substrate, abutting ultrasonic wave generating means generating torsional vibrations on a rim of the housing recess of the disc substrate, and ultrasonically forming a protrusion which is directed towards the inner space of the housing recess for mounting the magnetic plate on the disc substrate via the protrusion.

The present invention also provides a mounting device for mounting a magnetic plate on a disc substrate formed of a synthetic material. The device comprises a positioning means, a holding means, and an ultrasonic wave impressing means. The positioning means includes a recess engaged with a protuberance of the disc substrate. The holding means holds the positioned disc substrate against movement directed parallel and perpendicular to the disc substrate surface. The ultrasonic wave impressing device includes a horn abutted against the rim of the recess of the disc substrate through which a predetermined pressure is applied, and an ultrasonic oscillator for rotating the horn back and forth around the centerline of the recess of the disc substrate.

Since the torsional vibrations are generated by the ultrasonic wave generating device, the protrusion may be formed from the rim of the housing recess of the disc substrate with a precisely controlled thickness. Moreover, a constant clearance may be provided between the protrusion of the disc substrate and the magnetic plate.

DESCRIPTION OF THE PREFERRED EMBODIMENTS

Figure 4:
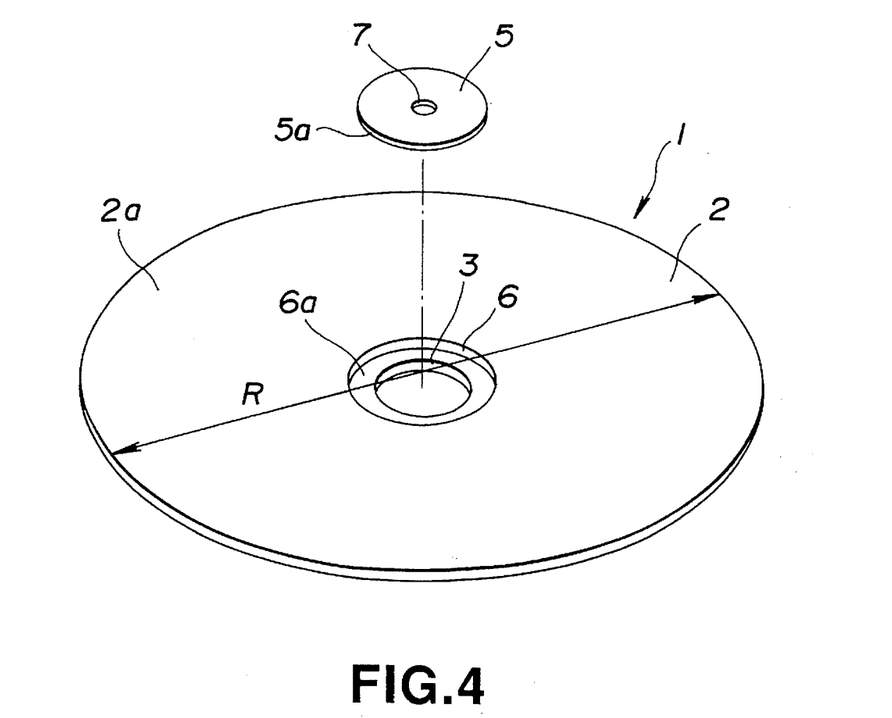
FIG. 4 is an exploded perspective view showing a magneto-optical disc to which a first embodiment of the present invention is applied.

Referring to the FIGS. 4 and 5, the mounting method according to a first embodiment of the present invention will be explained in detail.

A magneto-optical disc 1, to which the method according to the first embodiment of the present invention is applied, has a disc substrate 2 molded of a transparent synthetic material, such as polycarbonate. The disc substrate 2 is in the form of a disk having a diameter R of approximately 64 mm and a thickness $T_2$ of approximately 1.2 min.

The magneto-optical disc 1, comprising the disc substrate 2, has a recording layer of magnetic recording material for recording information signals. This layer is deposited on one of the major surfaces 2a of the disc substrate 2. The other major surface 2b of the disc substrate 2, opposite to the major surface 2a, is designed as a write/read surface for information signals. A light beam is radiated on the recording layer from the write/read surface of the magneto-optical disc 1 for recording or reproducing information signals.

The disc substrate 2 of the magneto-optical disc 1 has a centering aperture 3 adapted for being engaged by the centering member of a disc table of a disc rotating and driving unit provided within a recording/reproducing apparatus. The centering aperture 3 is formed as a hole in the center of the disc substrate 2. Its center aligns with the center of curvature of the recording track(s) formed spirally or concentrically on the recording layer.

Figure 5:
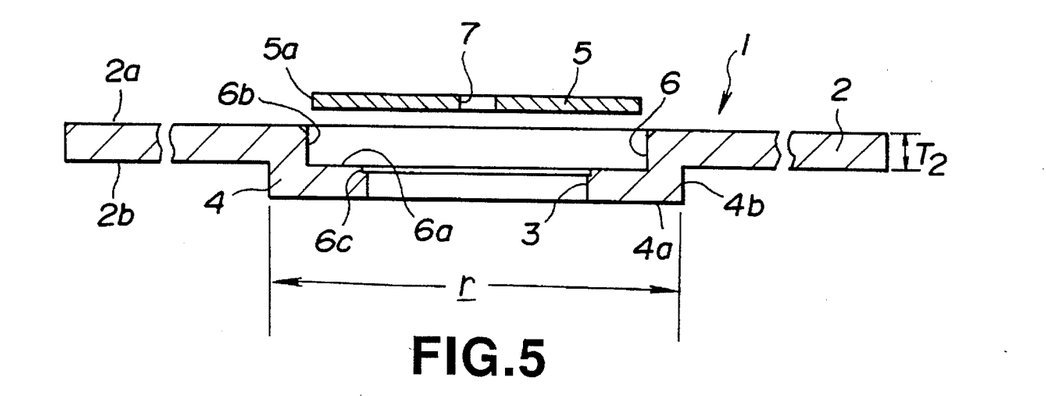
FIG. 5 is an exploded cross-sectional side view showing a magneto-optical disc to which the first embodiment of the present invention is applied.

The central region of the other major surface 2b of the disc substrate 2 has an integral annular protuberance 4 surrounding the centering aperture 3, as shown in FIG. 5. The protuberance 4 provides for a deeper depth of the centering aperture 3 formed in the thin disc substrate 2. This increases the amount of protuberance of the centering member, provided on the disc table adapted for loading the magneto-optical disc 1 thereon, with respect to the center aperture 3. Moreover, the protuberance 4 assures centering by loading the magneto-optical disc so that the center of rotation of the magneto-optical disc 1 is coincident with the axis of rotation of the disc table. In addition, the end face 4a of the protuberance 4 functions as a reference plane for loading of the disc on the disc table.

Meanwhile, the protuberance 4 is formed in the non-recording, radially inner region of the disc substrate 2 which is devoid of the signal recording layer, and has an amount of protuberance 4b approximately equal to the thickness $T_2$ of the disc substrate 2. Consequently, the portion of the disc substrate 2 formed with the protuberance 4 has a thickness twice that of the main body section of the disc substrate 2.

The central region of the major surface 2a of the disc substrate 2 has an annular housing recess 6 which surrounds the center aperture 3. The recess 6 is designed for accommodating a magnetic plate 5 therein. The recess 6 has a diameter smaller than the outer diameter r of the protuberance 4 and a depth approximately equal to the thickness $T_2$ of the disc substrate 2. The opening edge of the recess 6 is flared as compared to its inner region to facilitate insertion of the magnetic plate 5 into the housing recess 6 (flaring not shown). Thus, the major surface 2a of the disc substrate 2 is a smooth surface except at the region of the housing recess 6.

The inner rim of the bottom surface of the recess 6 functions as a setting surface 6a for the magnetic plate 5 and is formed with a step 6c. The purpose of the step 6c is to prevent burrs or the like from being formed on the setting surface 6a for the magnetic plate 5 during molding of the housing recess 6, thus assuring smoothness of the setting surface 6a.

The magnetic plate 5, housed within the recess 6, is produced by punching a sheet of a metallic material, such as stainless steel (SUS-430), having a thickness on the order off 0.4 mm, into the shape of a disk. The magnetic plate 5 is sized to be accommodated within the recess 6, without the outer rim 5a coming into contact with the inner wall 6b of the recess 6. The center region of the magnetic plate 5 has a small-sized circular aperture 7 for ease of handling during the manufacturing process.

Figure 6:
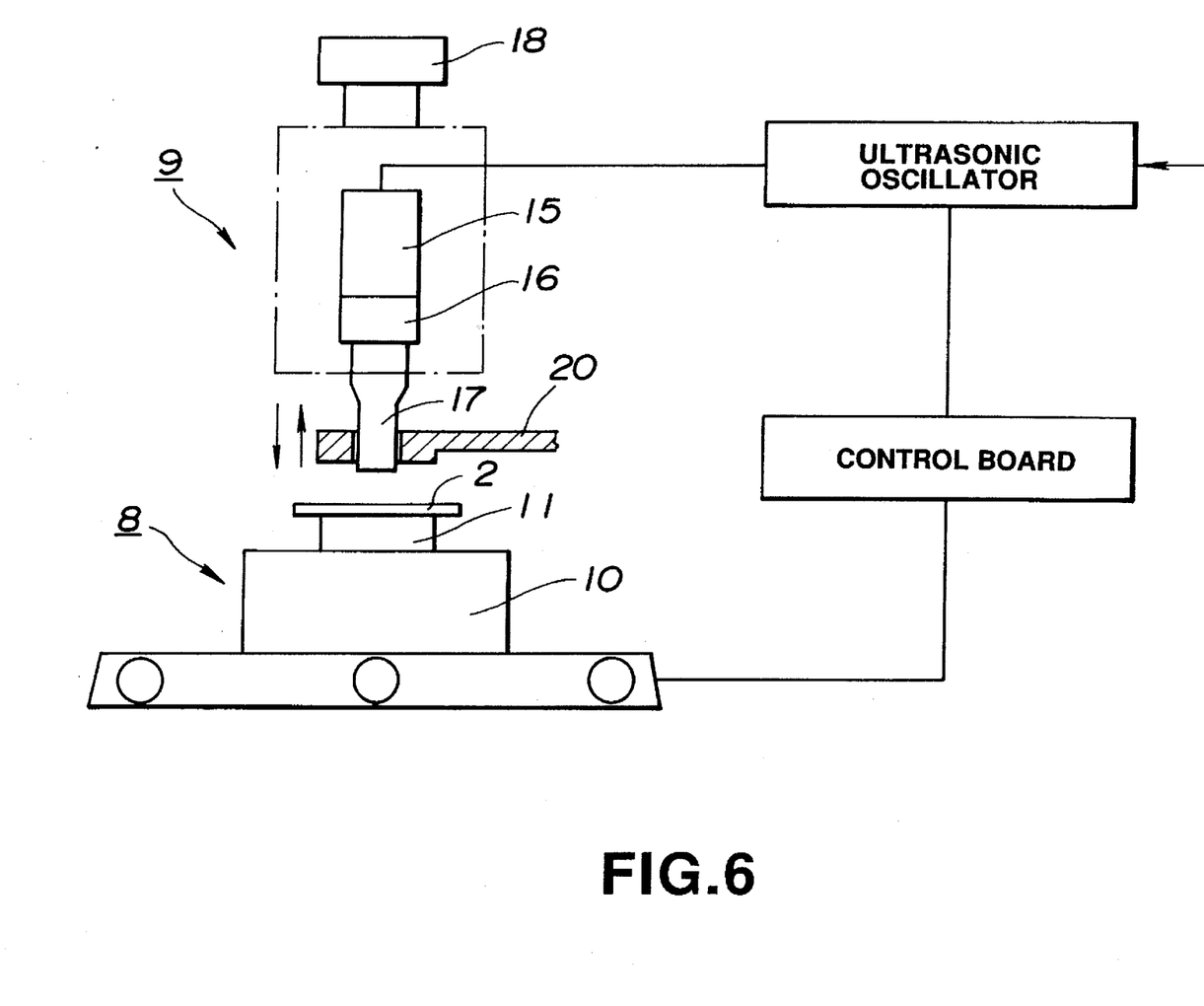
FIG. 6 is a front view showing a device for mounting the magnetic plate according to the first embodiment of the present invention.

The above-described magnetic plate 5 is mounted on the disc substrate 2 by a mounting device equipped with an ultrasonic wave generating unit. As shown in FIG. 6, the mounting device comprises a supporting table 8 for setting the disc substrate 2 thereon and an ultrasonic wave generating unit 9 for impressing ultrasonic waves to the disc substrate 2.

Figure 7:
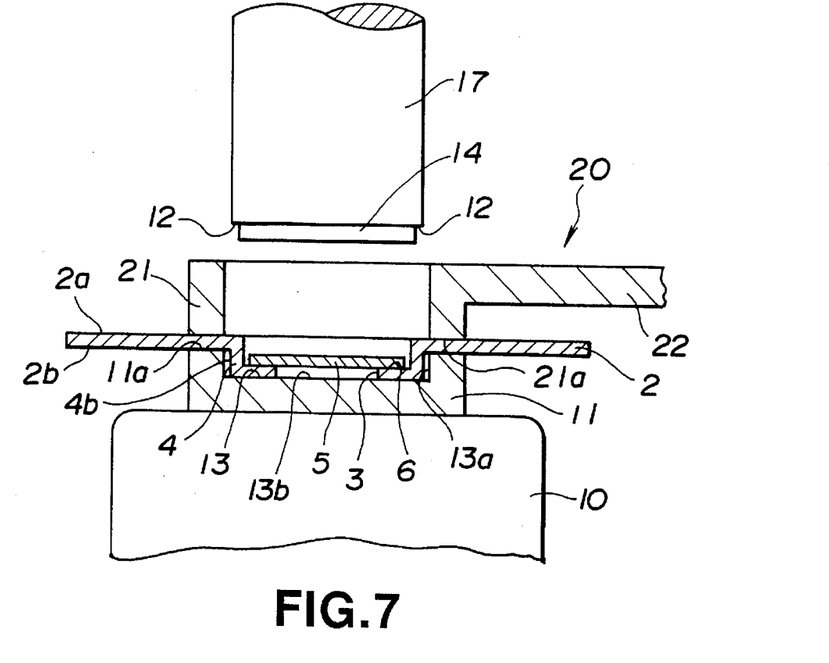
FIG. 7 is a cross-sectional side view showing the magnetic plate in initial position on the disc substrate.

The supporting table 8 positions the disc substrate 2 set thereon in a plane parallel thereto. The supporting table 8 includes, on the upper planar surface of the main body of the supporting table 10, a setting table 11 on which the disc substrate 2 is set into position. The setting table 11 is a disk having a central circular engaging recess 13 in which the protuberance 4 of the disc substrate 2 is engaged loosely, as shown in FIG. 7. The engaging recess 13 is sized so that a small clearance is left between its inner peripheral wall 13a and the outer peripheral surface 4b of the protuberance 4 when the protuberance 4 is accommodated therein. Thus the disc substrate 2 is positioned with respect to the setting table 11. The protuberance 4 of the disc substrate 2 has its reference plane 4a supported on the bottom surface 13b of the engaging recess 13.

With the disc substrate 2 thus positioned on the setting table 11, the disc substrate 2 has its major surface 2b, the data write/read surface, supported by the circular upper end face 11a of the setting table 11. The above-described supporting table 8 is provided with an evacuating unit, not shown, for positively securing the disc substrate 2 set on the setting table 11.

The ultrasonic wave generating unit 9 comprises an ultrasonic oscillator 15 which transduces electrical energies into mechanical energies, a cone 16 which amplifies mechanical vibrations of the ultrasonic oscillator 15, and a columnar horn 17 which propagates the amplified mechanical vibrations, as shown in FIG. 6.

The ultrasonic oscillator 15, cone 16, and horn 17, arrayed vertically in this order, are arranged as an integral unit which may be moved vertically by a pneumatic cylinder 18 with respect to the disc substrate 2. A controlling board is provided between the supporting table 8 and the ultrasonic oscillator. The controlling board controls the pressure and amplitude of the horn 17 as well as the depth of swaging with respect to the disc substrate 2.

Figure 8:
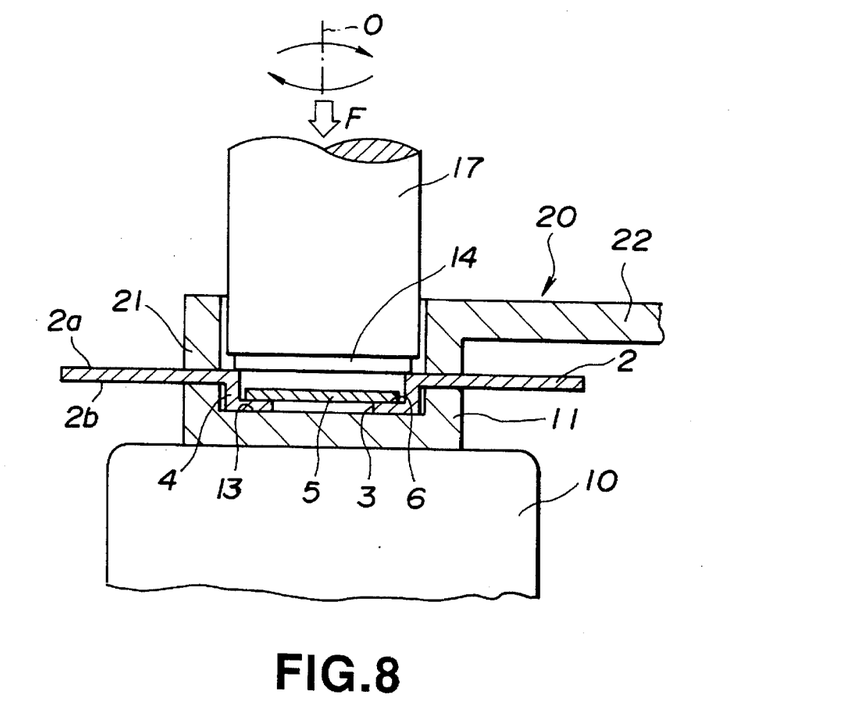
FIG. 8 is a cross-sectional side view showing a horn caused to bear against the disc substrate.

In the embodiment shown in FIGS. 7 and 8, the foremost part of the horn 17 has a step 12 which is formed outwardly of the outer periphery of a welding part 14 employed for swaging the rim of the housing recess 6 of the disc substrate 2. The step controls the flow of the melted resin from the rim of the welding part 14. The welding part 14 is a columnar section of a size large enough to swage the rim part of the housing recess 6.

The ultrasonic wave generating unit 9 is provided with a disc retention element 20 for positively securing the disc substrate 2 set on the setting table 11. The disc retention element 20 comprises a disc retainer 21 for immobilizing the disc substrate 2 from above and a supporting arm 22 extended integrally from and supporting the disc retainer 21.

The disc retainer 21 is formed as a ring with an outer diameter and size approximately equal to those of the setting table 11. The major surface 2a of the disc substrate 2 is supported in face-to-face contact with the annular planar disc retaining surface 21a of the disc retainer 21. The disc retainer 21 is designed to hold the portion of the disc substrate 2 which is radially inside of the recording layer in order to protect the recording layer. The supporting arm 22 is integrally formed with the disc retainer 21. The disc retainer 21 may be moved vertically with respect to the disc substrate 2 via this supporting arm 22.

The manner in which the magnetic plate 5 is loosely mounted on the disc substrate 2 using the above-described mounting device will now be explained. First, the disc substrate 2 is set on the setting table 11, as shown in FIG. 7. That is, the disc substrate 2 has its protuberance 4 housed and held within the engaging recess 13 formed in the setting table 11. This sets the loading position of the disc substrate 2 with respect to the setting table 11.

The evacuating system (not shown) provided within the setting table 11 is actuated, attracting the disc substrate 2 by vacuum suction, thereby immobilizing the disc substrate on the setting table 11. The magnetic plate 5 is then introduced into the housing recess 6 of the disc substrate 2, and is held in face-to-face contact with the bottom surface 6a of the housing recess 6. The disc retention element 20 is then lowered, contacting the disc substrate 2 set on the setting table 11. A predetermined pressure is applied to the disc retainer 21 of the disc retention element 20 for positively securing the disc substrate 2 on the setting table 11.

The horn 17 is then lowered by the pneumatic cylinder 18, causing the end welding part 14 thereof to bear against the opening rim of the housing recess 6 on the major surface 2a of the disc substrate 2 carrying the recording layer. With a predetermined pressure F applied to the disc substrate 2 by the pneumatic cylinder 18, a torsional vibration is impressed on the disc substrate 2.

The torsional vibration referred to herein denotes an oscillation generated by rotating the horn in a plane by alternately switching between a clockwise rotation and a counterclockwise rotation about axis O of the horn 17 as a center of rotation (see FIG. 8). The frequency of the torsional vibrations is set in consideration of controllability of the thickness of the protrusion 19 for preventing detachment of the magnetic plate 5 from the disc substrate 2 (see FIG. 9). Specifically, it is set within the range of 15 to 50 kHz, with a preferred frequency of 20 kHz. The amplitude of the torsional vibration is preferably in a range of from 20 µm to 70 µm, depending on the material of the disc substrate 2. In the first embodiment, the amplitude is set at 70 µm.

Figure 9:
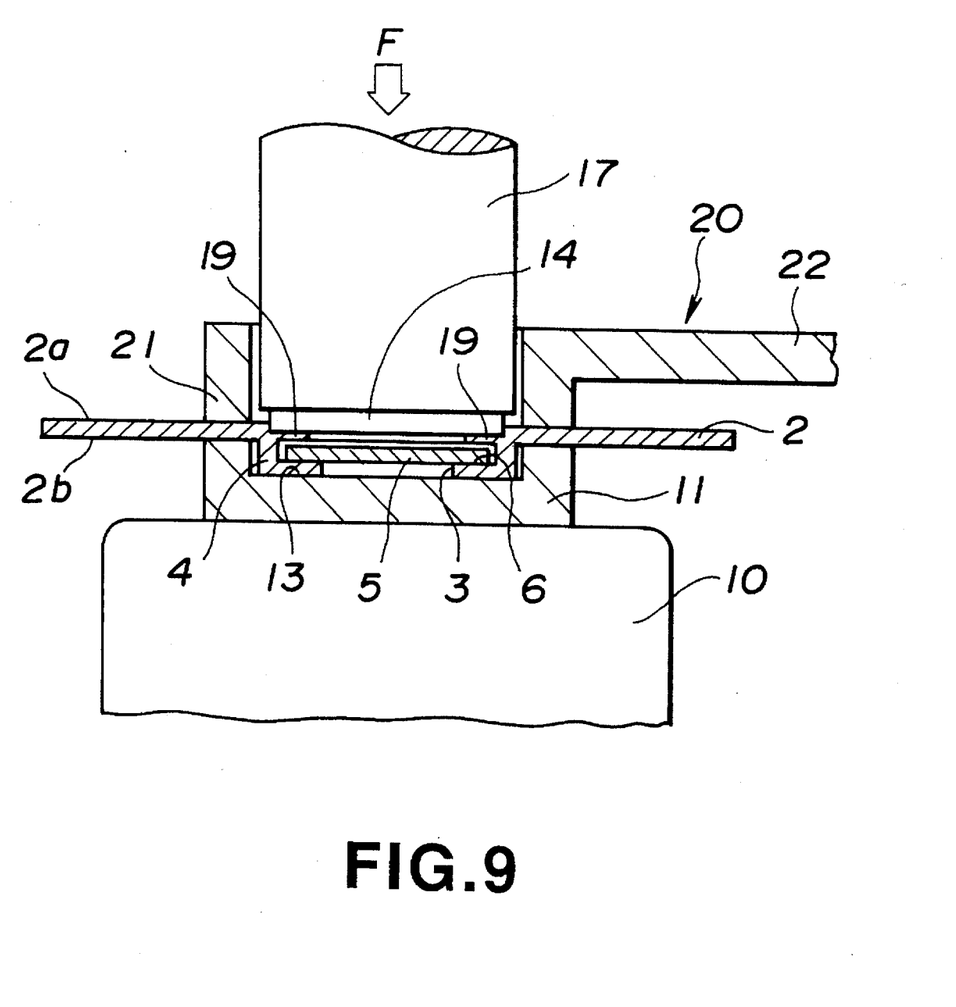
FIG. 9 is a cross-sectional side view showing a horn caused to bear against the disc substrate to impress ultrasonic vibrations to form a protrusion.
Figure 10:
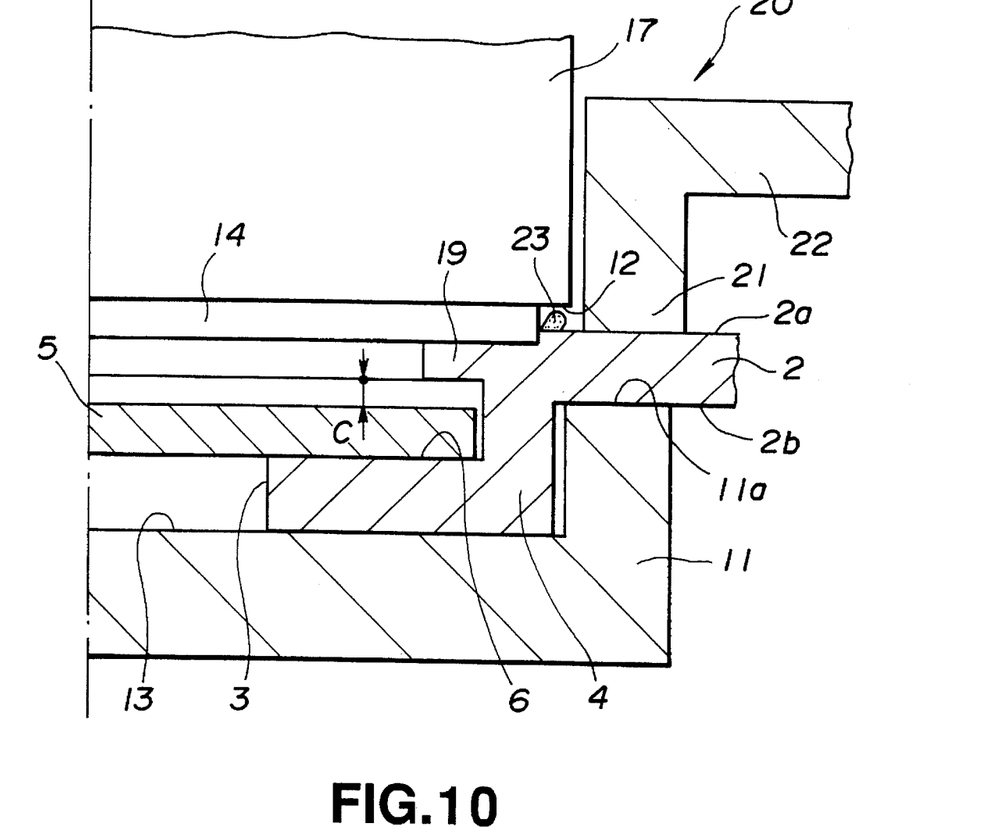
FIG. 10 is an enlarged cross-sectional side view showing the forming of the protrusion shown in FIG. 9.

The opening rim of the housing recess 6, contacted by the horn 17, is melted by the heat of friction, as shown in FIG. 9. Part of the melted resin 23 tends to flow out from the outer periphery of the welding part 14 of the horn 17, as shown in FIG. 10. However, such flow of the melted resin 23 is inhibited by the step surface of the step 12. Thus, the melted resin 23 flowing from the major surface 2a of the disc substrate 2 is regulated in height. If the melted resin 23 flows too far upwards, it contacts the inner wall surface of the main cartridge body when the disc 1 is housed within the main cartridge body to form a disc cartridge. This affects the centering etc. of the magneto-optical disc 1. With the present first embodiment, since the melted resin 23 flowing from the opening rim may be controlled in height, there is no such problem when the disc is accommodated within the main cartridge body.

When the torsional ultrasonic vibration is applied, the resin material constituting the opening rim of the housing recess 6 flows toward the center of the housing recess 6, forming a recess corresponding in size to the welding part 14 of the horn 17, as shown in FIG. 9. In this manner, a protrusion 19 extending towards the inner region of the housing recess 6 is formed at the opening rim of the housing recess 6. The protrusion 19 is formed to overlie the outer rim 5a of the magnetic plate 5, accommodated within the housing recess 6, for preventing the magnetic plate 5 from being detached from the disc substrate 2. The thickness of the protrusion 19 can be determined with accuracy because the torsional vibration is approximate to a horizontally directed vibration in the in-plane direction of the disc substrate 2.

After the end of formation of the protrusion 19, the horn 17 and the disc retention element 20 are lifted away from the disc substrate 2 and the operation of evacuation is discontinued in order to remove the disc substrate 2.

Figure 11:
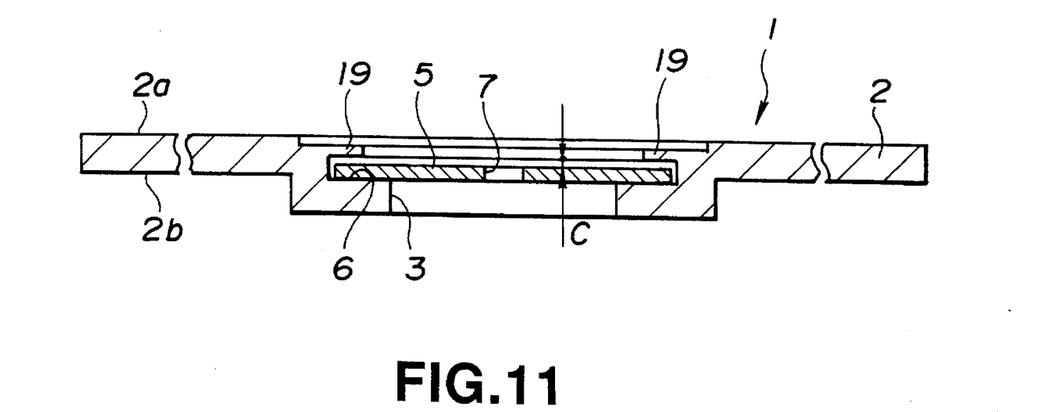
FIG. 11 is a cross-sectional side view showing the magnetic plate mounted in final position on the disc substrate.

As a result of the above process, the magneto-optical disc 1 has the magnetic plate 5 loosely mounted on the disc substrate 2. Since the thickness of the protrusion 19 formed by impressing ultrasonic vibrations may be determined with high accuracy, the magnetic plate 5 may be loosely fitted and held with respect to the disc substrate 2 with a preset amount of clearance C (see FIG. 10). In this manner, the disc substrate 2 may be prevented from being deformed due to the difference in the thermal expansion coefficients of the disc substrate 2 of a synthetic material and the magnetic plate 5 of a magnetic metal material.

Figure 12:
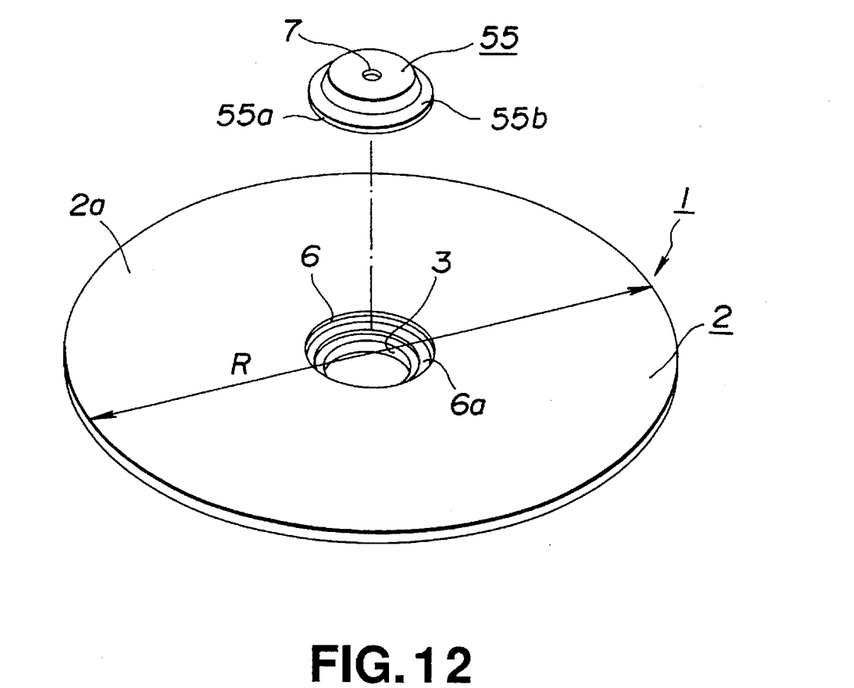
FIG. 12 is an exploded perspective view of a magneto-optical disc to which a second embodiment of the present invention is applied.

Referring to FIG. 12ff., a second embodiment of the present invention is explained in detail. In the second embodiment, the parts or components common to those of the preceding embodiment are indicated by the same reference numerals and the corresponding explanation is omitted for simplicity.

Figure 13:
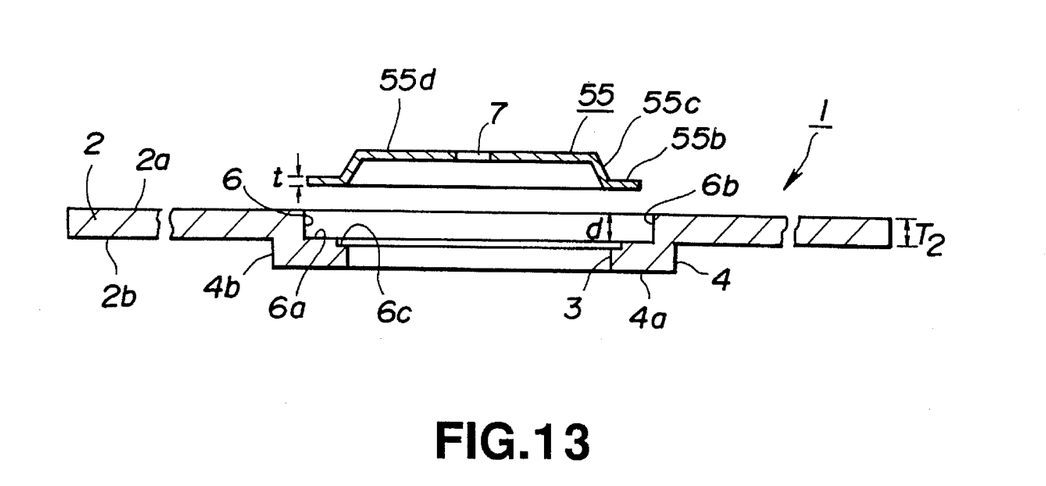
FIG. 13 is a cross-sectional side view showing a disc substrate and a magnetic plate constituting the magneto-optical disc shown in FIG. 12.

A magnetic plate 55, accommodated within the housing recess 6 of the disc substrate 2, is fabricated by punching a metallic material, such as stainless steel (SUS-430) having a thickness t on the order of 0.4 mm, in the shape of a disk, as shown in FIGS. 12 and 13.

The magnetic plate 55 is of a size to be housed within the housing recess 6. The magnetic plate 55 has its outer rim bent to form a step, in order that, when the magnetic plate 55 is housed within the housing recess 6, the central major surface section 55d is flush with the major surface 2a of the disc substrate 2 and the outer rim part of the magnetic plate 55 is placed on the inner peripheral surface 6a of the housing recess 6. Moreover, the magnetic plate 55 is sized such that when housed within the housing recess 6, its outer peripheral surface 55a does not contact the inner peripheral wall 6b of the housing recess 6. The outer peripheral region of the magnetic plate 55 comprises a bent section 55c which slopes downwards towards the rim region and which is contiguous to a setting section 55b adapted for being set on the setting surface 6a. The magnetic plate 55 in its entirety is formed as a centrally recessed disk, as shown in FIGS. 12 and 13. The magnetic plate 55 has a small-sized circular hole 7 at its center for ease of handling during manufacture.

Figure 14:
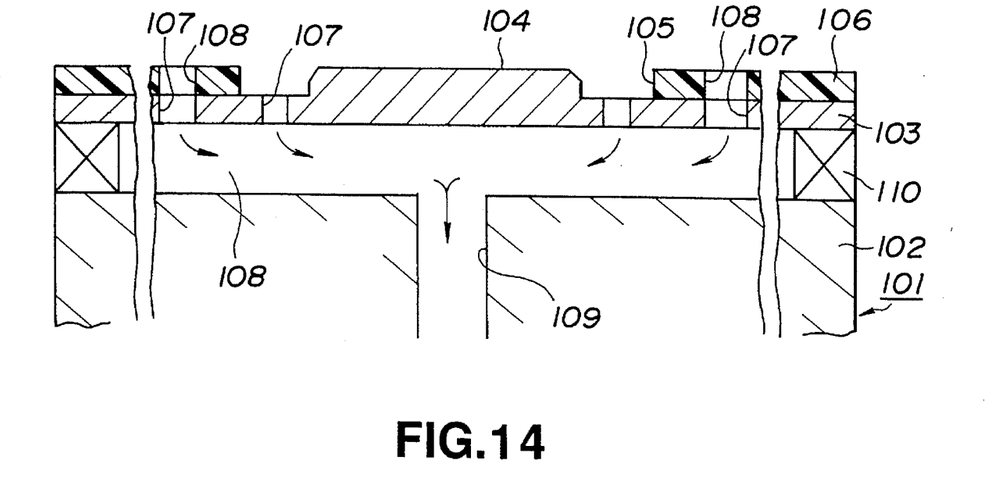
FIG. 14 is a schematic cross-sectional side view showing a disc supporting table employed in the method according to the second embodiment of the present invention.
Figure 15:
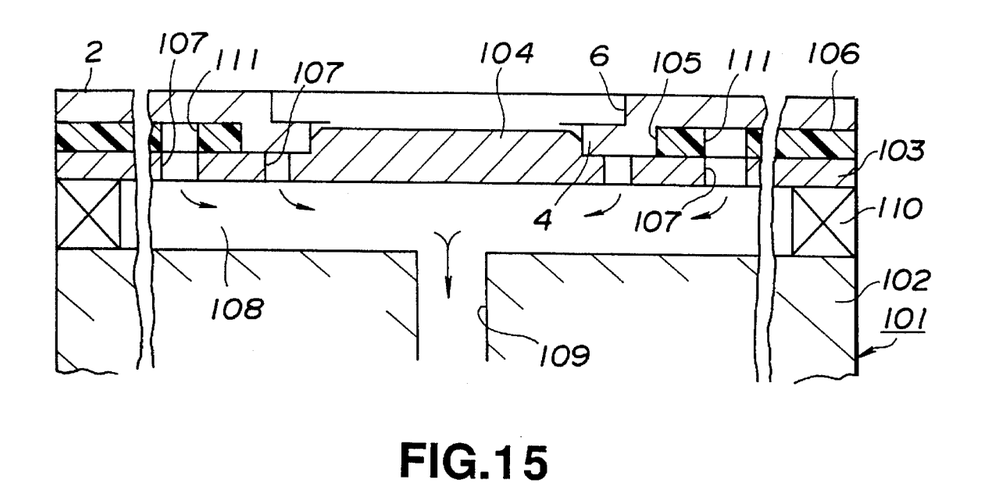
FIG. 15 is a schematic cross-sectional side view showing the disc substrate loaded on the disc supporting table.

The process steps and the manner of mounting the above-described magnetic plate 55 on the disc substrate 2 will now be explained. First, the disc substrate 2 is set on a suction type supporting table 101, as shown in FIGS. 14 and 15. The suction type supporting table 101 is arranged for holding the disc substrate 2 under suction. The supporting table 101 includes a setting table 103 on the upper surface of the main member of the supporting table 102 for setting the disc substrate 2 in position thereon, as shown in FIG. 15. The setting table 103 has a central boss 104 engaged with the center aperture 3 in the disc substrate 2 and an engaging valley 105 on an outer perimeter of the boss 104 engaged with the protrusion 4 of the disc substrate 2.

A protective sheet 106 formed of a pliable material, such as silicon rubber, is bonded to the disc substrate setting surface side of the setting table 103 adapted for receiving the major surface 2b of the disc substrate 2. The protective sheet 106 prevents damage to the major surface 2b of the disc substrate 2 when set upon the setting table 103.

The suction type supporting table 101 is provided with an evacuating system for sucking the disc substrate 2 set on the setting table 103 using a vacuum pump. The evacuating system includes multiple suction ports 107 and a suction air chamber 108 constructed by providing multiple spacers 110 between the setting table 103 and the main member of the supporting table 102. The evacuating system operates such that the suction air chamber 108 is evacuated by a vacuum pump, not shown, via an air passage 109 formed in the main member of the supporting table 102.

The suction ports 107 are formed in the setting table 103 at the positions in register with the outer periphery and the mid part of the disc substrate 2 and within the region of the engaging valley 105 engaged by the protrusion 4. By providing the suction ports 107 at these positions in the setting table 103, the entire area of the disc substrate 2 is supported in substantially uniform pressure contact with the setting table 103. It is noted that the protective sheet 106 is also formed with through-holes 111 at positions in register with the suction holes 107.

The disc substrate 2 is set on the above-described suction holding table 101 with the housing recess 6 directed upwards, as shown in FIG. 15. Moreover, the disc substrate 2 is loaded with the boss 104 received in the center aperture 3 in the housing recess 6 and with the protrusion 4 engaged in the engaging valley 105. In this manner, the disc substrate 2 is securely loaded in position on the suction holding table 101.

With the disc substrate 2 thus loaded on the suction holding table 101, the vacuum pump is actuated for sucking air from the suction air chamber 108 via the air passage 109. This causes air confined between the disc substrate 2 and the suction holding table 101 to be sucked via suction ports 107, 111. The disc substrate 2 is thereby supported in intimate contact with the protective sheet 106 by the suction holding table 101.

Figure 16:
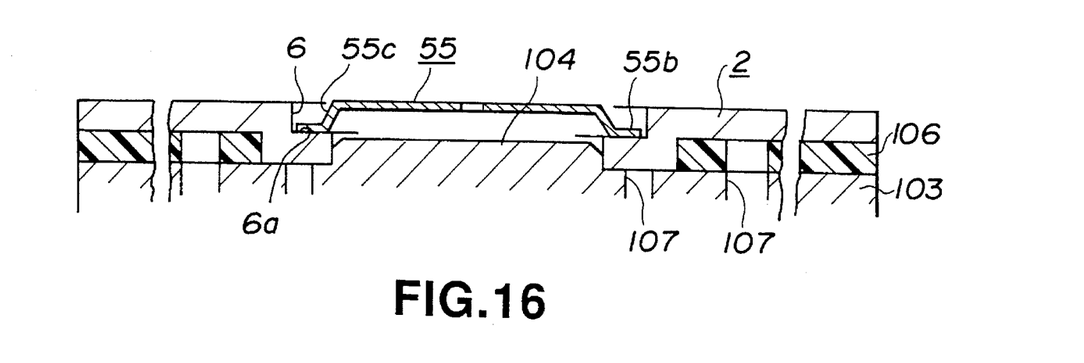
FIG. 16 is a cross-sectional side view showing the magnetic plate accommodated in a housing recess of the disc substrate to which the mounting method of the second embodiment of the present invention is applied.

After the disc substrate 2 is loaded in this manner on the suction holding table 101, the magnetic plate 55 is placed within the housing recess 6. At this time, the magnetic plate 55 has the setting section 55b set on the setting surface 6a of the housing recess 6.

Figure 17:
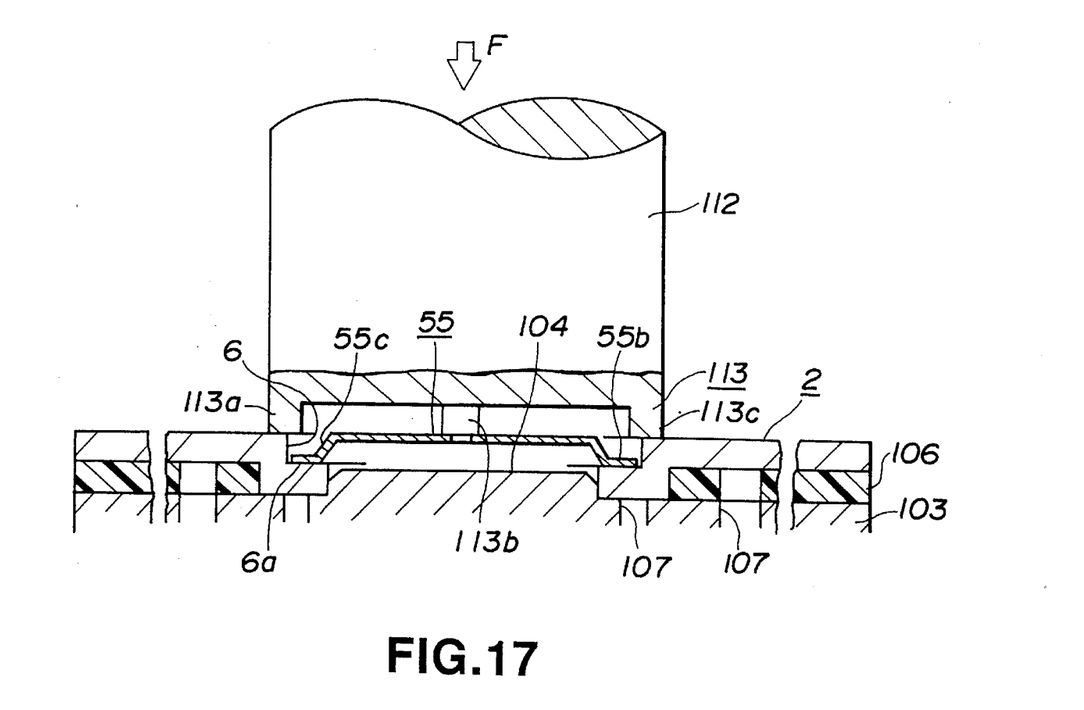
FIG. 17 is a cross-sectional side view showing an ultrasonic vibration impressing device in contact with the rim of the housing recess of the disc substrate.

With the magnetic plate 55 housed in this manner in the housing recess 6, a vibration impressing device 112, a resonator of an ultrasonic wave impressing device (not shown), descends onto the disc substrate 2 set on the suction holding table 101 until a contacting end part 113 contacts with the rim of the housing recess 6.

Figure 18:
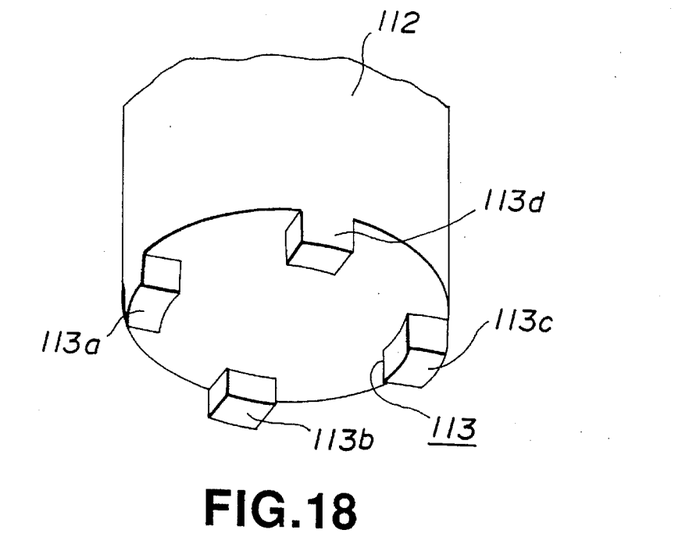
FIG. 18 is a partial perspective view showing the vibration impressing device employed in the mounting method according to the second embodiment of the present invention.

The contacting end part 113 of the impressing device 112 is made up four contactors 113a to 113d adapted for contacting four equiangular points on the rim of the housing recess 6, as shown in FIGS. 17 and 18. Specifically, the contacting end part 113 includes the first to fourth contactors 113a to 113d, each formed at an angular interval of 90° at the end face of the impressing device 112, as shown in FIG. 18.

With the four contactors 113a to 113d of the contacting end part 113 in contact with the rim of the housing recess 6 as shown in FIG. 17, the ultrasonic wave impressing device (not shown) generates ultrasonic vibrations from the impressing device 112. The ultrasonic vibrations emanated from the impressing device 112 are so-called torsional vibrations consisting of alternate reciprocating circular vibrations in the directions shown by arrows A and B in FIG. 19, with the axis O of the impressing device 112 as the center of the alternate reciprocating rotations. Consequently, with the impressing device 112 in contact with the rim of the housing recess 6, ultrasonic vibrations in the circular direction are impressed on the disc substrate 2 in a plane parallel to its major surface.

Figure 19:
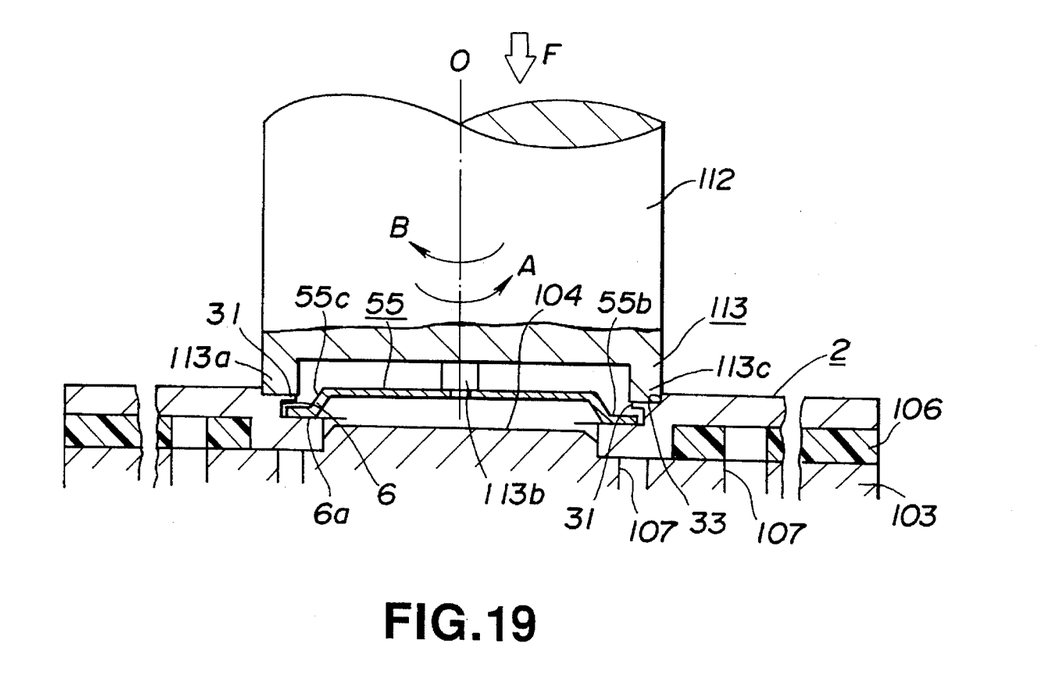
FIG. 19 is a side view, shown partially in cross-section, showing the vibration impressing device of FIG. 18 in contact with the rim part of the housing recess in the disc substrate, with the device forming the protrusion via the application of ultrasonic vibrations.
Figure 20:
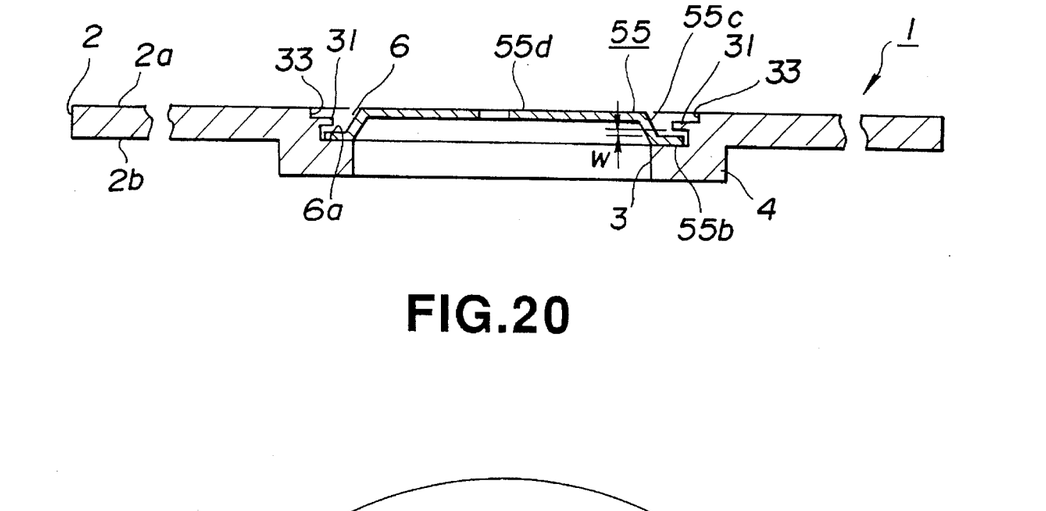
FIG. 20 is a cross-sectional side view showing the magnetic plate mounted in final position on the disc substrate.

With the ultrasonic vibrations impressed in this manner, the rim portions of the housing recess 6 contacted by the four contactors 113a to 113d are heated and softened. Since the impressing device 112 is pressed at a predetermined pressure, recessed parts 33 are formed on the rim of the housing recess 6 in register with the contactors 113a to 113d of the impressing device 112, at the same time that projecting parts 31 are formed towards the radially inner region of the housing recess 6. These projecting parts 31 are projected to overlie the setting sections 55b of the magnetic plate 55 housed within the housing recess 6, as shown in FIG. 19. After the projecting parts 31 have been formed by contacting the four contactors 113a to 113d with the rim of the housing recess 6 for a predetermined time, the vibration impressing device 112 is removed from the disc substrate 2 and reverted to its initial position.

Figure 21:
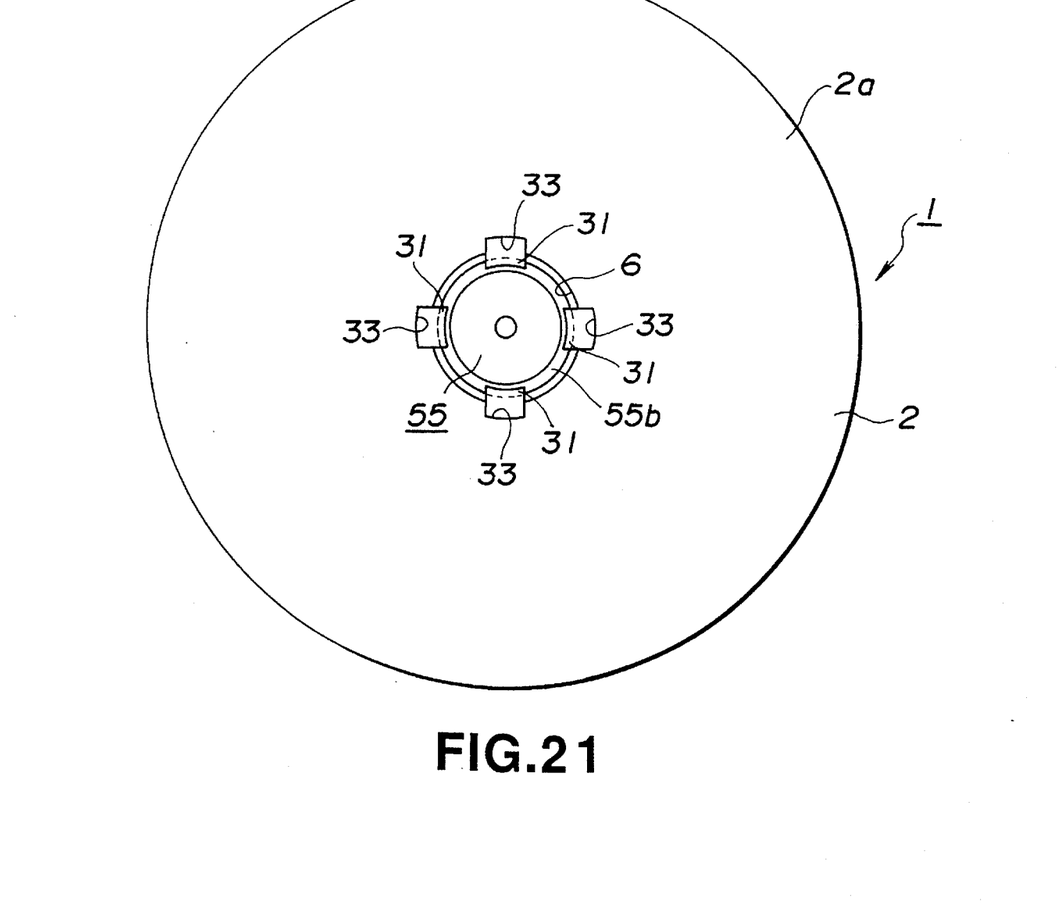
FIG. 21 is a plan view showing a magneto-optical disc having the magnetic plate mounted thereon in accordance with the second embodiment of the present invention.

In the above-described second embodiment, the four contactors 113a to 113d contact simultaneously with the four corresponding peripheral points of the housing recess 6. The four projecting parts 31 as shown in FIG. 21 for holding the metal plate 55 accommodated within the housing recess 6 are thus simultaneously formed. Alternatively, the projecting parts 31 may be formed on the rim of the housing recess 6 using a vibration impressing device 112 having a contacting end part 113 having two contactors at diametrically opposite positions.

If the projecting parts 31 are formed using the vibration impressing device 112 having a pair of contactors, only two projecting parts 31 are formed at two diametrically opposite positions on the rim of the housing recess 6. If four projecting parts 31 are to be formed as shown in FIG. 21, the vibration impressing device 112 may be rotated about its axis so that a first pair of projecting parts 31 are first formed by one impression of ultrasonic vibrations and a second pair of projecting parts 31 are subsequently formed by a second impression of ultrasonic vibrations after rotation of the vibration impressing device by 90°.

Meanwhile, the ultrasonic vibrations impressed on the disc substrate 2 are in a plane parallel to the major surface 2a of the disc substrate 2, with the direction of the oscillations being concentric with the circumference of the disc substrate. The rim of the housing recess 6, softened by contact with the contacting end part 113 of the impressing device, is caused to flow along the circumference of the housing recess 6 which is the direction of reciprocating rotation of the ultrasonic vibrations. The softened rim of the housing recess 6 is also caused to flow inwardly toward the vacant inner region of the rim 6 to form projecting parts 31. These projecting parts 31 overlie the setting sections 55b of the magnetic plate 55.

On the other hand, since the ultrasonic vibrations impressed on the disc substrate are horizontally directed vibrations within a plane parallel to the major surface 2a of the disc substrate 2, only a small fraction of these vibrations are transmitted along the thickness of the disc substrate 2. Consequently, the inner region of the body of the disc substrate 2 is heated only to a limited extent so that the deformation of the projecting parts 31 along the thickness of the disc substrate is limited. The result is that the projecting parts 31 projecting into the inner void space of the housing recess 6 may be controlled in thickness. That is, by setting the depth d of the housing recess 6 so as to be deeper than the thickness t of the magnetic plate 55, a gap w may be maintained between the projecting parts 31 on one hand and the setting section 55b on the other hand. This enables the magnetic plate 55 to be held loosely within the housing recess 6.

It is noted that the frequency of the ultrasonic vibration applied to the disc substrate 2, which is formed of polycarbonate and to which the method according to the second embodiment of the present invention is applied, is set within a range of 15 to 50 kHz. That is, if the ultrasonic vibration has a frequency lower than 15 kHz, sufficient heat generation cannot be achieved, whereas, if the ultrasonic vibration has a frequency higher than 50 kHz, heat generation becomes excessive, rendering it difficult to control the amount of softening of the rim region which is to be softened by contact with the vibration impressing device 112. The ultrasonic vibration to be impressed preferably has a frequency on the order of 20 kHz.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. A method of mounting a magnetic plate on a disc substrate, comprising:

placing the magnetic plate within a recess of the disc substrate;

abutting an ultrasonic wave generating means on a rim of said recess of said disc substrate; and generating substantially only a torsional ultrasonic wave having a frequency in the range of 15 to 50 kHz by operating the ultrasonic wave generating means, thereby ultrasonically forming a protrusion in contact with said disc substrate directed towards a radially inner space of said recess for mounting said magnetic plate between said protrusion and said disc substrate, wherein a clearance is formed between the magnetic plate and the protrusion, and further, wherein the magnetic plate is capable of movement relative to and is not rigidly affixed to the substrate.

2. The method of claim 1, wherein said ultrasonic wave generating means is caused to abut on the disc substrate with the disc substrate being held by setting means and retention means.

3. The method of claim 1, wherein said ultrasonic wave generating means is caused to abut on the disc substrate with the disc substrate being held by holding means and with the recess thereof directed upwards.

4. A method for mounting a magnetic plate on a disc substrate formed of a synthetic material, comprising:

placing the magnetic plate within a recess of the disc substrate;

applying ultrasonic wave generating means to a rim of the recess of said disc substrate, wherein the ultrasonic wave generating means includes a horn having an end step which abuts the rim of the recess; and generating substantially only a torsional ultrasonic wave having a frequency in the range of 15 to 50 kHz by operating the ultrasonic wave generating means, to form a protrusion extending from the rim of the recess towards an inner region of the recess for mounting said magnetic plate between said protrusion and said disc substrate, wherein a clearance is formed between the magnetic plate and the protrusion, and further, wherein the magnetic plate is capable of movement relative to and is not rigidly affixed to the substrate.

5. A device for mounting a magnetic plate to a disc substrate formed of a synthetic material, comprising:

setting means having a setting recess which is engaged with a protuberance of the disc substrate, the protuberance having a side facing the setting means and an opposite side;

holding means for holding the disc substrate on said setting means, said disc substrate being set on said setting means with the magnetic plate being placed within a recess of said disc substrate which is formed on the opposite side of said protuberance from the side facing the setting means, said holding means having an opening; and ultrasonic wave generating means for generating substantially only a torsional ultrasonic wave having a frequency in the range of 15 to 50 kHz, said wave generating means having a horn introduced via said opening of said holding means, whereby a portion of the disc substrate recess is melted by action of the ultrasonic waves to form a protrusion which partially overlies the magnetic plate, wherein a clearance is formed between the magnetic plate and the protrusion, and further, wherein the magnetic plate is capable of movement relative to and is not rigidly affixed to the substrate.

6. The device of claim 5, wherein a step is formed at a portion of said horn of said ultrasonic wave generating means to assist it being abutted against said disc substrate.

7. The device of claim 6, wherein said ultrasonic wave generating means further comprises:

an ultrasonic oscillator for reciprocatingly rotating said horn back and forth around a centerline of the recess of the disc substrate.

8. A device for mounting a magnetic plate to a disc substrate formed of a synthetic material, comprising:

setting means having a setting recess engaged with a protuberance of the disc substrate, the protuberance having a side facing the setting means and an opposite side;

holding means for holding the disc substrate on the setting means, said holding means having an engaging section adapted for being engaged with said opposite side of the protuberance of the disc substrate, wherein said disc substrate is positioned by having the protuberance thereof engaged with said setting recess, the magnetic plate being placed within a recess of the disc substrate formed on the opposite side of the protuberance; and ultrasonic wave generating means for generating substantially only a torsional ultrasonic wave having a frequency in the range of 15 to 50 kHz, wherein said wave generating means includes a horn and an ultrasonic oscillator for reciprocatingly rotating said horn around the centerline of the recess of the disc substrate as a center of reciprocating rotation, and further, wherein said horn is mounted for vertical movement towards and away from the disc substrate and is adapted for being abutted against the recess of said disc substrate, whereby a portion of the disc substrate recess is melted by action of the ultrasonic waves to form a protrusion which partially overlies the magnetic plate, wherein a clearance is formed between the magnetic plate and the protrusion, and further, wherein the magnetic plate is capable of movement relative to and is not rigidly affixed to the substrate.

9. The device of claim 8, wherein said horn has plural convex contactors on the portion abutted against the disc substrate.

10. The device of claim 8, wherein said setting means includes plural through-holes and suction means for applying a suction force to the disc substrate via said through-holes.

11. A device for mounting a magnetic plate on a disc substrate formed of a synthetic material, comprising:

positioning means for setting the disc substrate thereon, said positioning means having a positioning recess which engages with a protuberance of said disc substrate, the protuberance having a side facing the positioning recess and an opposite side which forms a disc substrate recess within which is placed the magnetic plate, the positioning means being adapted for positioning said disc substrate by engaging the protuberance of the disc substrate with said positioning recess;

holding means for holding said disc substrate positioned by said positioning means so as not to be moved in directions parallel or perpendicular to the surface of said disc substrate; and ultrasonic wave generating means for generating substantially only a torsional ultrasonic wave having a frequency in the range of 15 to 50 kHz, wherein the wave generating means includes a horn and an ultrasonic oscillator for reciprocatingly rotating said horn around a centerline of the recess of the disc substrate, and further, wherein said horn is abutted against the recess of said disc substrate, whereby a portion of the disc substrate recess is melted by action of the ultrasonic waves to form a protrusion which partially overlies the magnetic plate, wherein a clearance is formed between the magnetic plate and the protrusion, and further, wherein the magnetic plate is capable of movement relative to and is not rigidly affixed to the substrate.

12. A method for mounting a magnetic plate having an upper surface and a lower surface on a disc substrate, comprising:

placing the magnetic plate into a recess formed in the disc substrate, wherein the lower surface of the plate is in contact with the disc substrate;

abutting an ultrasonic wave generator to the upper surface of the magnetic plate; and generating substantially only a torsional ultrasonic wave having a frequency in the range of 15 to 50 kHz by operating the ultrasonic wave generator, thereby forming a protrusion of a desired thickness for mounting the plate between the protrusion and the substrate, wherein a clearance is formed between the magnetic plate and the protrusion, and further, wherein the magnetic plate is capable of movement relative to and is not rigidly affixed to the substrate.

13. The method of claim 12, wherein the torsional ultrasonic wave is generated by rotating the ultrasonic wave generator in a reciprocating manner about a centerline of the recess in the disc substrate.

* * * * *